(12) United States Patent
Montandon et al.

(10) Patent No.: US 11,562,543 B2
(45) Date of Patent: Jan. 24, 2023

(54) METHOD AND SYSTEM FOR AUGMENTED REALITY VISUALISATION

(71) Applicant: DIOTASOFT, Antony (FR)

(72) Inventors: Christophe Montandon, Gradignan (FR); Jean-Baptiste Delhommeau, Eysines (FR)

(73) Assignee: DIOTASOFT, Antony (FR)

( * ) Notice: Subject to any disclaimer, the term of this patent is extended or adjusted under 35 U.S.C. 154(b) by 0 days.

(21) Appl. No.: 17/278,543

(22) PCT Filed: Sep. 9, 2019

(86) PCT No.: PCT/FR2019/052196
§ 371 (c)(1),
(2) Date: Mar. 22, 2021

(87) PCT Pub. No.: WO2020/058642
PCT Pub. Date: Mar. 26, 2020

(65) Prior Publication Data
US 2021/0350626 A1      Nov. 11, 2021

(30) Foreign Application Priority Data
Sep. 21, 2018   (FR) ...................................... 1858576

(51) Int. Cl.
*G06T 19/00*    (2011.01)
*G06T 7/70*    (2017.01)
(Continued)

(52) U.S. Cl.
CPC ............. *G06T 19/006* (2013.01); *G06T 7/40* (2013.01); *G06T 7/70* (2017.01); *G06T 15/04* (2013.01);
(Continued)

(58) Field of Classification Search
None
See application file for complete search history.

(56) References Cited

U.S. PATENT DOCUMENTS

| 9,436,993 B1 | 9/2016 | Stolka et al. |
| 2016/0171775 A1* | 6/2016 | Todeschini ........... G06Q 30/016 345/633 |

(Continued)

FOREIGN PATENT DOCUMENTS

EP      2715662 B1      7/2019

OTHER PUBLICATIONS

Cosco et al., Visuo-Haptic Mixed Reality with Unobstructed Tool-Hand Integration, IEEE Transactions on Visualization and Computer Graphics, vol. 19, No. 1, (Jan. 2013), pp. 159-172.

(Continued)

*Primary Examiner* — Frank S Chen
(74) *Attorney, Agent, or Firm* — TraskBritt

(57) ABSTRACT

A method for visualizing an image combining an image (Ic) of a real object (200) originating from a video capture system (300) with digital information (In) originating from a three-dimensional model of the equipment, comprising: carrying out a processing operation to superimpose, in real time, a reference point (402) of the three-dimensional model with a reference point (302) of the video capture system and an object reference point (202) of the real object, and displaying at least some of the digital information superimposed on the image captured by the video capture system, further comprising: an initial step (Ei) of recording the reference texture (T200) of the real object, and a step (Ea) of analyzing the images transmitted by the video capture system, the analysis step comprising: generating a synthesis image from the captured image, and from the three-dimensional model of the equipment textured using the recorded (Continued)

texture; a step of calculating a composite image by mixing the synthesis image and the captured image.

5 Claims, 2 Drawing Sheets

(51) Int. Cl.
  *G06T 7/40* (2017.01)
  *G06T 15/04* (2011.01)
  *G06T 17/00* (2006.01)

(52) U.S. Cl.
  CPC .... *G06T 17/00* (2013.01); *G06T 2207/10016* (2013.01)

(56) References Cited

U.S. PATENT DOCUMENTS

| | | |
|---|---|---|
| 2017/0140552 A1 | 5/2017 | Woo et al. |
| 2018/0108325 A1 | 4/2018 | Schwarz et al. |
| 2018/0197336 A1 | 7/2018 | Rochford et al. |
| 2019/0121441 A1* | 4/2019 | Ishikawa ............... G06F 3/011 |
| 2021/0042992 A1* | 2/2021 | Newman ............... G06T 15/205 |

OTHER PUBLICATIONS

Fuchs et al., Augmented Reality Visualization for Laparoscopic Surgery, Conference: Medical Image Computing and Computer-Assisted Intervention—MICCAI'98, First International Conference, Cambridge, MA, USA, Oct. 11-13, 1998, 10 pages.

Herve, Jean-Yves, Dynamic Registration for Augmented Reality in Telerobotics Applications, https://www.researchgate.net/publication/3876389, Feb. 2000), 7 pages.

International Search Report for International Application No. PCT/FR2019/052196 dated Jan. 17, 2020, 3 pages.

International Written Opinion for International Application No. PCT/FR2019/052196 dated Jan. 17, 2020, 7 pages.

* cited by examiner

METHOD AND SYSTEM FOR AUGMENTED REALITY VISUALISATION

CROSS-REFERENCE TO RELATED APPLICATIONS

This application is a national phase entry under 35 U.S.C. § 371 of International Patent Application PCT/FR2019/052196, filed Sep. 19, 2019, designating the United States of America and published as International Patent Publication WO 2020/058642 A1 on Mar. 26, 2020, which claims the benefit under Article 8 of the Patent Cooperation Treaty to French Patent Application Serial No. 1858576, filed Sep. 21, 2018.

TECHNICAL FIELD

The present disclosure relates to a system for visual display of information on real objects, for augmented reality applications in industry, in particular, for the design, the manufacture, the assembly, or the maintenance of technical equipment.

BACKGROUND

Various augmented reality systems are known for extending the perception of the visual reality, and, in particular, visualization systems using a viewing screen, a tablet, or augmented reality glasses displaying a combination of image capture of the real object, and data in the form of a digital image of the virtual mockup of the associated object.

These augmented reality solutions make it possible to improve the effectiveness of manual work steps in manufacture, assembly and maintenance, and, at the same time, the quality of the work. The precise transmission of information, for example, the state of digital planning (CAO model), directly to an item of equipment, makes the transmission complex and makes the construction plans subject to error, by using dispensable models and other measuring instruments. A visual variance comparison can be carried out at any time, and in a manner intuitive for a user. Moreover, work instructions, for example, step-by-step instructions, may be provided directly on the work object or in the user's field of vision, i.e., exactly where they are actually necessary. Typical scenarios of application of the present disclosure include worker assistance systems for displaying assembly and maintenance instructions, and information for quality assurance. For example, the assembly positions or the drilling holes may be marked precisely, or weld points or supports to be verified may be identified. The system is also capable of providing assistance to maintenance personnel on-site, by non-resident experts.

In the prior art, U.S. Pat. No. 9,436,993 is known, which describes an augmented reality system comprising an image processing system; a first imaging module comprising one or more cameras in communication with the image processing system, in which the image processing system is designed to:

receive secondary image data originating from a second imaging device;
segment the secondary image data in order to determine a first surface of interest;
receive imaging data in real time from the first imaging module, the imaging data in real time originating from the camera or cameras comprising images of one or more of: a second surface of interest, an anchoring marker, and an orientation of the surface, a plurality of early or late markers, and tools;
calculate a recording transformation of the first surface of interest with respect to the second surface of interest, using one or more from: the anchor marker, the plurality of early or late markers, or the second surface;
calculate a tracking location of the first imaging module with respect to the first surface of interest, using one or more of the following elements: the anchor marker, the plurality of early or late markers, the second surface, or features of the second surface; and
create an improved image by combining information originating from imaging data in real time, with corresponding information calculated from the secondary image data on the basis of the location of the first imaging module.

In order to ensure perfect synchronization of the referential of the virtual image and a real object, a method for camera location and 3D reconstruction in a partially known environment is known from the European Patent No. 2715662. The method of locating a camera and 3D reconstruction of the static environment in which it develops, comprises an object of interest, the 3D model of which is known, which method comprises the following steps:

a/ calculating an initial placement of the camera in the surroundings, and an initial reconstruction,
b/ calculating the placement of the camera for each new image by matching 3D primitives of the surroundings with 2D primitives of the image, and reconstructing 3D primitives of the surroundings by triangulation,
c/ simultaneous optimization of the placements of the camera and the 3D primitives by minimizing a reprojection error on a plurality of images.

The 3D model is a geometric description of the object of interest, the reprojection error not comprising two types of terms, a first type of terms associated with primitives limited by the 3D model, and a second type of terms associated with primitives of the environment other than the object, and the step of optimization comprises a sub-step of association of the primitives with the environment or the 3D model.

The prior art solutions are not entirely satisfactory, since they do not allow for the visualization of the augmented reality information on the masked parts of the real object, for example, by the operator's hand, a robot arm, or a processing tool being interposed between the camera and the object.

In the solutions of the prior art, the digital information appears in an overlaid manner, not with the object but with the image of the element interposed between the camera and the object, which reduces the usefulness of the information.

BRIEF SUMMARY

The present disclosure aims to overcome these disadvantages.

For this purpose, according to a first aspect of the present disclosure, a method is proposed for visualizing an image combining an image of a real object originating from a video capture system with digital information originating from a three-dimensional model of the equipment, comprising:

real-time adjustment processing of a reference point of the three-dimensional model with a reference point of the video capture system, an object reference point of the real object, and
displaying at least some of the digital information superimposed on the image captured by the video capture system.

The method according to the present disclosure further comprises an initial step of recording the reference texture of the real object.

The method according to the present disclosure further comprises a step of analyzing the images transmitted by the video capture system.

The three-dimensional model can be recorded on any recording medium, either local, such as a portable device, for example, a telephone or a tablet, or remote, for example, on a digital server.

According to the present disclosure, the analysis step comprises:
generating a synthesis image from the captured image and the three-dimensional model of the textured equipment from the recorded texture, and
a step of calculating a composite image by mixing the synthesis image and the captured image.

The synthesis image may comprise additional digital information, for example, labels.

During the step of calculating the composite image by mixing, the synthesis image may be applied on top of the captured image, having a transparency that is greater than a predetermined threshold. The predetermined threshold may, for example, be 50%.

According to a second aspect of the present disclosure, a system is proposed comprising:
a video capture system,
a recording medium comprising a virtual mockup,
a real item of equipment associated with the digital mockup,
a visualization module designed to implement the initial step and the analysis step according to the first aspect of the present disclosure, or one or more of the improvements thereof.

According to a third aspect of the present disclosure, a computer program product is proposed which can be directly loaded into the internal memory of a computer, comprising software code portions for executing the steps of the visualization method according to the first aspect of the present disclosure, or one or more of the improvements thereof, when the program is executed on a computer.

BRIEF DESCRIPTION OF THE DRAWINGS

Other data, features and advantages of the present disclosure will emerge from reading the description of implementations and embodiments, which are in no way limiting, with reference to the accompanying drawings, in which.

DETAILED DESCRIPTION

Since the embodiments described in the following are in no way limiting, it is, in particular, possible to envisage variants of the present disclosure that comprise only a selection of features described in the following, in a manner isolated from the other features described, if this selection of features is sufficient for providing a technical advantage or for distinguishing the present disclosure from the prior art. This selection comprises at least one feature, preferably functional and without structural details, or having some of the structural details if this part alone is sufficient for providing a technical advantage or for distinguishing the present disclosure from the prior art.

An embodiment of a system according to the present disclosure and of a method according to the present disclosure will now be described together.

Figure 1:
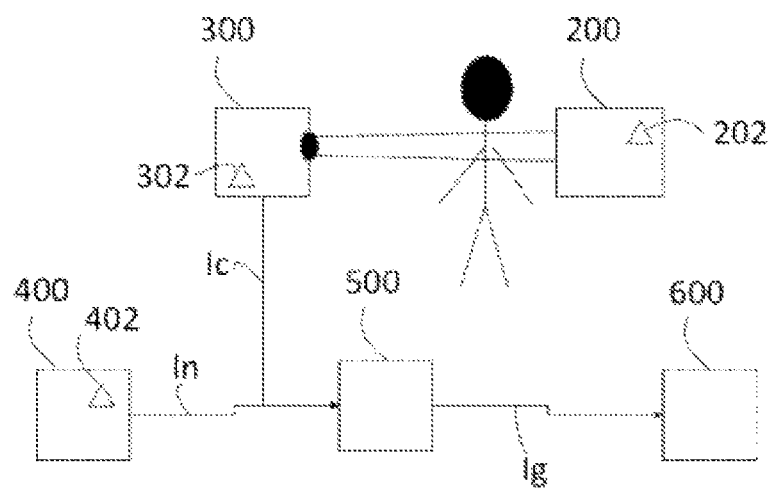
FIG. 1 is a diagram of a system according to the present disclosure.

FIG. 1 shows an embodiment of a system 100 according to the present disclosure.

A real object 200 is shown schematically.

The video capture system 300 can capture one or more images of the real object 200 and produce captured images Ic.

A digital information server 400 is shown schematically in FIG. 1. The digital information server comprises a recording of a three-dimensional model of the real object 200. The digital information server 400 is designed to generate digital information In.

It will be understood that the three-dimensional model could be recorded on a recording medium other than a digital server, for example, on a portable device, such as a telephone or a tablet.

A computer 500 is shown schematically in FIG. 1. The computer 500 is designed to: receive the image Ic captured by the video capture system 300, receive digital information In relating to the real object 200 and generated by the digital information server 400, combine the received image with the received information.

The computer 500 is furthermore designed to implement real-time adjustment processing of a reference point 402 of the three-dimensional model with a reference point 302 of the video capture system 300 and an object reference point 202 of the real object 200. The real object is shown in a virtual environment in the form of a virtual object, in which the elements are represented according to a reference point specific thereto, the reference point 402. The real object is in a separate environment and is positioned according to a reference point that is not directly associated with that of the virtual world, the reference point 202. The video capture system 300 observes the real world through a camera, which makes it possible to generate an image of the workpiece in its environment. The real object can be seen in the image, projected on the image plane and placed in a zone of which the coordinates are associated with an image reference point, the reference point 302. By virtue of adjustment technology, it is possible to identify visual elements that can be associated with the virtual scene, and thus replace the different objects, in a virtual environment. It is thus known to place the camera in a relative position of the virtual object such that the image produced by the camera is aligned with the 3D virtual model as in the real world. This alignment then makes it possible to achieve a projection of the texture (image) of the object on the virtual 3D model, which is explained in the following.

The computer 500 is also designed to generate an image Ig comprising at least some of the digital information superimposed on the image captured by the video capture system 300.

A visualization device 600 is furthermore shown in FIG. 1. The visualization device 600 is designed to display the image Ig generated by the computer 500.

The image Ig may be viewed by a supervisor (not shown) for the purpose of checking various parameters of the real object 200.

It will be understood that when a user U intervenes on the object, some of their body may be interposed between the real object 200 and the video capture system 300.

On the image Ic captured by the video capture system 300, a portion of the real object 200 is thus masked by the interposed body part of the user.

Figure 2:
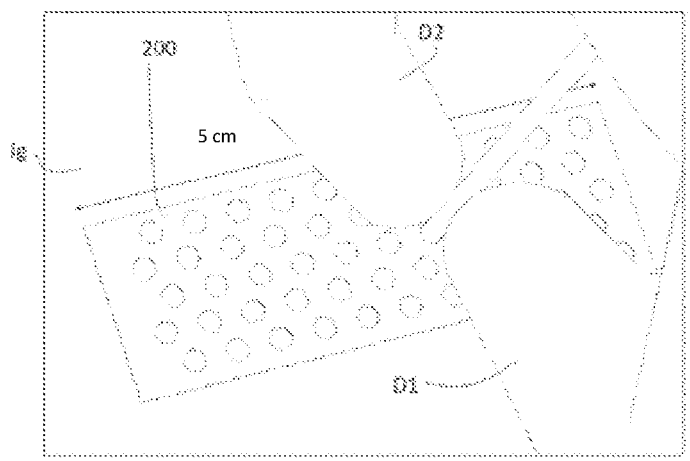
FIG. 2 is a diagram of an image partially blacked out using a method according to the prior art.

FIG. 2 shows the image Ig displayed by the visualization device 600 when two fingers D1, D2 of the user U are interposed between the video capture system 300 and the real object 200. The presence of the information, in augmented reality, of the size of the object—5 cm in the example shown—will also be noted. The size information of the object originates from the digital information In.

In this case, the supervisor cannot monitor, in real time, the state of the real object 200—at least a portion of the object is masked.

The method according to the present disclosure comprises:
- an initial step Ei of recording a reference texture of the real object, and
- a step of analyzing the image IC captured by the video capture system 300.

In the embodiment shown in FIG. 2, it will be noted that the real object has a dotted texture 204. The recorded texture is denoted T200.

The analysis step Ea comprises extraction Ee of what are known as visible zones Zv, the texture of which corresponds to the recorded texture T200, and what are known as masked zones Zm, the texture of which differs from the recorded texture T200.

The analysis step further comprises a calculation step Ec of calculating a composite image Icomp by mixing:
- masked zones Zm of the three-dimensional model with the reference texture T200 corresponding to the masked zones Zm,
- visible zones Zv of the three-dimensional model with the texture extracted from the image Ic acquired by the video capture system.

The analysis step further comprises superposition of the digital information In onto the composite image thus calculated.

The analysis step Ea also comprises:
- generating a synthesis image from the captured image and the three-dimensional model of the textured equipment from the recorded texture,
- a step of calculating a composite image by mixing the synthesis image and the captured image.

Figure 3:
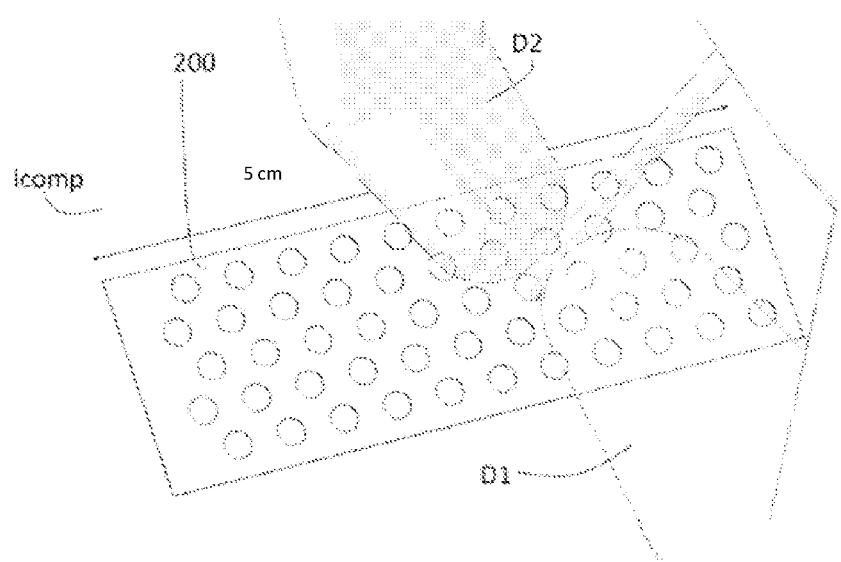
FIG. 3 is a diagram of an image obtained using the method according to the present disclosure.

FIG. 3 shows an image Icomp calculated by the calculation step Ec.

It will be noted that, on the image Icomp, the zones previously masked by the user's fingers have been replaced using the three-dimensional model of the equipment, and the recorded texture T200. Thus, the zones have been replaced using the three-dimensional model of the equipment, previously augmented by the recorded texture T200.

Thus, the present disclosure relates not only to a background plane, but indeed to the real geometry of the object and its texture, which are subsequently used to remove the blacking-out by impressing, on the blacked-out object, the texture learned upstream.

In the methods according to the prior art, background estimation techniques exist, where the color/intensity level of a pixel is estimated using probabilistic methods, which are the result of a temporal integration of the images, making it possible to predict what relates to the background and what is moving and to be ignored. It is not possible to apply these methods when the obstacle is static, the model ending up integrating it as a background object. According to the present disclosure, the pre-recorded and correctly adjusted texture is superimposed, whatever the dynamic of the scene.

Of course, the present disclosure is not limited to the embodiments described above, and a number of developments can be made to the embodiments, without departing from the scope of the present disclosure. Moreover, the various features, types, variants, and embodiments of the present disclosure may be associated with one another, in accordance with various combinations, insofar as they are not mutually incompatible or exclusive.

The invention claimed is:

1. A method for visualizing an image combining a captured image of a real object originating from a video capture system with digital information originating from a three-dimensional model of equipment, comprising:
   an initial step of recording a reference texture of the real object;
   real-time adjustment processing of a reference point of the three-dimensional model with a reference point of the video capture system and a reference point of the real object, the real-time adjustment processing comprising identifying visual elements associated with a virtual scene and using image processing to visually position the video capture system in a relative position to the real object such that the captured image is aligned with the three-dimensional model;
   displaying at least some of the digital information superimposed on the image captured by the video capture system from the real-time processing; and
   a step of analyzing images transmitted by the video capture system, the analysis step comprising:
   generation of a synthesis image from the superimposed display on the captured image and from the three-dimensional model of the textured equipment, on the basis of the recorded texture, by replacing masked zones on the basis of the textured three-dimensional model; and
   a step of calculating a composite image by mixing the synthesis image and the captured image.

2. The method of claim 1, further comprising superpositioning the digital information onto the calculated composite image.

3. The method of claim 1, wherein, during the step of calculating the composite image by mixing, the synthesis image is applied on top of the captured image, the applied synthesis image having a transparency that is equal to a predetermined threshold.

4. A system, comprising:
   a video capture system;
   a recording medium comprising a virtual mockup;
   a real item of equipment associated with the virtual mockup; and
   a visualization system comprising a computer and a visualization device, wherein the visualization system is configured to implement a method including an initial step of recording a reference texture of a real object, and a step of analyzing images transmitted by the video capture system, the analysis step comprising:
   generation of a synthesis image from a superimposed display of a captured image and a three-dimensional model of the real object, by replacing masked zones on the basis of the three-dimensional model; and
   a step of calculating a composite image by mixing the synthesis image and the captured image,
   wherein the computer is configured to perform real-time adjustment processing comprising visually positioning the video capture system in a relative position to the real object using image processing of the captured image such that the captured image is aligned with the three-dimensional model.

5. A non-transitory computer-readable medium storing instructions thereon that, when executed by at least one processor, cause the at least one processor to perform steps comprising:

recording a reference texture of a real object;

real-time adjustment processing of a reference point of a three-dimensional model with a reference point of a video capture system and a reference point of the real object, the real-time adjustment processing comprising identifying visual elements associated with a virtual scene and using image processing of the captured image to visually position the video capture system in a relative position to the real object such that the captured image is aligned with the three-dimensional model;

displaying at least some of digital information superimposed on an image captured by the video capture system from the real-time processing; and analyzing images transmitted by the video capture system, comprising:

generation of a synthesis image from the superimposed display on the captured image and from the three-dimensional model of the textured equipment, on the basis of the recorded texture, by replacing masked zones on the basis of the textured three-dimensional model; and calculating a composite image by mixing the synthesis image and the captured image.

* * * * *

UNITED STATES PATENT AND TRADEMARK OFFICE
CERTIFICATE OF CORRECTION

| | | |
|---|---|---|
| PATENT NO. | : 11,562,543 B2 | Page 1 of 1 |
| APPLICATION NO. | : 17/278543 | |
| DATED | : January 24, 2023 | |
| INVENTOR(S) | : Christophe Montandon and Jean-Baptiste Delhommeau | |

It is certified that error appears in the above-identified patent and that said Letters Patent is hereby corrected as shown below:

On the Title Page
In ITEM (57), ABSTRACT:

Line 1,     delete "(Ic)"
    Line 2,     delete "(200)"
    Line 3,     delete "(300)" and delete "(In)"
    Line 6,     delete "(402)"
    Line 7,     delete "(302)"
    Line 8,     delete "(202)"
    Line 10,     change "system," to --system.--
    Line 11,     change "further comprising: an initial step (Ei) of recording the" to --The--
    Line 12,     delete "(T200)" and change "object, and a step (Ea)" to --object is recorded, and--
    Line 13,     delete "of analyzing"
    Line 14,     change "system, the analysis step comprising:" to --system are analyzed by--

Page 2,     Line 1,     change "texture; a step of calculating" to --texture, and-- and change "image by" to --image is calculated by--

Signed and Sealed this
Eleventh Day of July, 2023

*Katherine Kelly Vidal*

Katherine Kelly Vidal
*Director of the United States Patent and Trademark Office*